United States Patent
Ross et al.

[15] 3,702,426
[45] Nov. 7, 1972

[54] DIMETHYLOLPROPIONIC ACID BASED ELECTROLYTES FOR ELECTRICAL CAPACITORS

[72] Inventors: Sidney D. Ross; Franz S. Dunkl, both of Williamstown; Manuel Finkelstein, North Adams, all of Mass.

[73] Assignee: Sprague Electric Company, North Adams, Mass.

[22] Filed: Dec. 3, 1971

[21] Appl. No.: 204,481

[52] U.S. Cl. ................................. 317/230, 252/62.2
[51] Int. Cl. ............................................. H01g 9/00
[58] Field of Search ...... 317/230, 231, 233; 252/62.2

[56] References Cited

UNITED STATES PATENTS

| | | | |
|---|---|---|---|
| 2,036,669 | 4/1936 | Yngve | 317/230 |
| 2,022,500 | 11/1935 | Clark et al. | 317/230 |
| 3,539,881 | 11/1970 | Anderson | 317/230 |
| 3,580,845 | 5/1971 | Dahle | 317/235 |

*Primary Examiner*—James D. Kallam
*Attorney*—Vincent H. Sweeney

[57] ABSTRACT

An electrolytic capacitor containing new electrolyte systems comprising a solvent containing a compound derived from $\alpha, \alpha$-dimethylolpropionic acid:

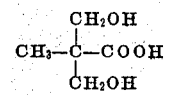

9 Claims, 1 Drawing Figure

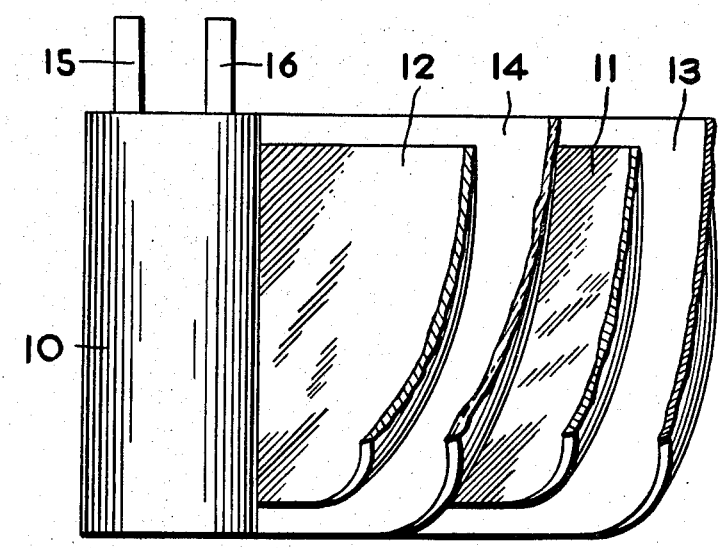

DIMETHYLOLPROPIONIC ACID BASED ELECTROLYTES FOR ELECTRICAL CAPACITORS

BACKGROUND OF THE INVENTION

This invention relates to an electrolytic capacitor and more particularly to a capacitor containing a new electrolyte system.

Electrolytic capacitors have been the subject of extended research and large scale use during the last half century. Most capacitors of this type have been made with anodes consisting of aluminum and tantalum foils or sintered tantalum pellets having a thin dielectric coating of oxide. The patent and technical literature abound with suggested ionogens as well as solvents for them which are useful as forming and/or working electrolytes for electrolytic capacitors. Of this multitude of electrolytes which have been disclosed, few have achieved commercial significance. At present, most electrolytic capacitors employ either relatively simple borate and water systems, or else rather complex borate systems which contain anion species other than the simple borate in a suitable organic solvent. Many prior art electrolytes, e.g. ammonium pentaborate in ethylene glycol, dissolve anodic aluminum oxide to a considerable degree upon heating at or near 85°C.

It is therefore an object of the present invention to provide a relatively simple, alternative electrolyte system for foil capacitors, capable of being substituted for ones presently in use.

It is another object of the present invention to provide a capacitor employing an electrolyte which does not attack anodic aluminum oxide at elevated temperatures.

It is a further object of this invention to provide an electrolytic capacitor capable of long term reliable operation under temperature conditions varying from −55°C up to 125°C.

SUMMARY OF THE INVENTION

Electrolyte systems have been prepared from $\alpha, \alpha$-di-methylolpropionic acid, $$\begin{array}{c} CH_2OH \\ | \\ CH_3-C-COOH \\ | \\ CH_2OH \end{array}$$

so as to provide electrolytic capacitors with electrolytes that are reliable under a wide variety of operating temperatures and voltages.

BRIEF DESCRIPTION OF THE DRAWING

The sole FIGURE of the drawing is an isometric view of a partially unwound capacitor of the present invention. The capacitor electrodes contemplated herein may be tantalum or aluminum.

The drawing illustrates a capacitance section 10 of the type with which the present invention is concerned. Anode 11 of the capacitance section 10 is of a valve metal such as tantalum or aluminum having formed on its surface an oxide layer which functions as the dielectric. Cathodic contact 12 is of a valve metal or inert metal, as desired. Porous spacers 13 and 14 are fully impregnated with the electrolyte compositions of this invention. Tabs 15 and 16 are connected to the electrode foil 11 and cathodic contact foil 12 respectively as terminals. The capacitance section 10 is then placed in a capacitor housing (not shown) that can be a metal or non-metal container.

DESCRIPTION OF THE PREFERRED EMBODIMENTS

In general, this invention provides an electrolytic capacitor containing an electrolyte based on a solvent having dissolved therein a compound based on $\alpha, \alpha$-dimethylolpropionic acid. The following compounds can be used with dimethylformamide or other solvents as electrolytes of this invention, but are not to be construed as limiting.

EXAMPLE I

Tetramethylammonium $\alpha, \alpha$-dimethylolpropionate,

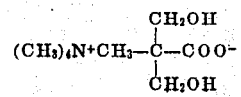

This is prepared by adding an equivalent amount of a 10% aqueous solution of tetramethylammonium hydroxide to a methanolic solution of $\alpha, \alpha$-dimethylolpropionic acid, removing the solvents in vacuo and crystallizing the salt from dimethylformamide (100 ml. per 0.1 mole of the salt); m.p. 218°C.

EXAMPLE II

Tetramethylammonium boro-di-$\alpha, \alpha$-dimethylolpropionate. This was prepared by dissolving $\alpha, \alpha$-dimethylolpropionic acid (2 moles), adding, first, tetramethylammonium hydroxide (1 mole) as a 10% aqueous solution and then, boric acid (1 mole) dissolved in water. The solution is taken to dryness with the water pump and crystallized from isopropanol-ether. Most of this product was soluble in isopropanol, and the product from this solvent had a melting point in the range of 199°–204°C.

Analysis calculated for $C_{14}H_{28}BNO_8$: C, 48.16; H, 8.08; N, 4.01. Found: C, 48.46; H, 8.39; N, 4.63.

The isopropanol insoluble material was crystallized from methanol-ether and had a melting point in the range of 205°–209°C.

Analysis calculated for $C_{14}H_{28}BNO_8$: C, 48.16; H, 8.08; N, 4.01. Found: C, 47.36; H, 8.16; N, 3.82.

When used with dimethylformamide as an electrolyte, the two compounds that were isolated appear to be electrically equivalent.

EXAMPLE III

Diisopropylammonium $\alpha, \alpha$-dimethylolpropionate,

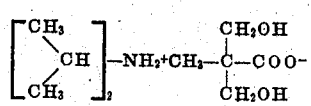

This salt was prepared by neutralizing a methanolic solution of the acid with a methanolic solution of the amine, removing the solvent and crystallizing from methanol-ether; m.p. 98°–100° C.

EXAMPLE IV 1,4-diazabicylooctane α, α -dimethylolpropionate,

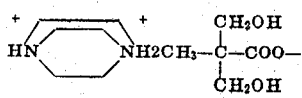

This was also prepared by neutralizing one mole of the amine with two moles of the acid in methanol. The product was crystallized from methanol-ether, m.p. 207°–209° C.

The utility of these salts as electrolyte solutes was studied by measuring the resistivity of dimethylformamide solutions at 25° C. and determining the maximum formation voltages at 85° C with a current density of 2 mA/cm² for boiled aluminum foil. Measurements were, in some cases, made with and without added boric acid. These results are compiled in Table I.

TABLE I

| Salt | Conc. mole$^{-1}$ | H$_3$BO$_3$ mole$^{-1}$ | Resistivity ohm-cm | Maximum Formation Voltage |
|---|---|---|---|---|
| Example | | | | |
| I | 0.1 | 0 | 305 | 260 |
| I | 0.25 | 0 | 169 | 202 |
| II | 0.1 | 0 | 372 | 180 |
| II | 0.3 | 0 | 207 | 153 |
| II | 0.1 | 0.2 | 411 | 203 |
| III | 0.1 | 0 | 2070 | 408 |
| III | 0.25 | 0 | 1130 | 348 |
| III | 0.25 | 0.125 | 530 | 415 |
| III | 0.25 | 0.25 | 461 | 425 |
| IV | 0.30 | 0 | 1250 | 327 |
| IV | 0.30 | 0.15 | 488 | 270 |

The boron complexes formed in Examples III and IV by the addition of boric acid thereto would be diisopropylammonium boro-di-α , α -dimethylolpropionate and 1,4-diazabicylooctane boro-di-α , α -dimethylolpropionate.

The diisopropylammonium α , α -dimethylolpropionate can be prepared in situ in dimethylformamide by adding appropriate quantities of the amine and the acid to the solvent. The results with electrolytes prepared this way are shown in Table II, wherein A is the concentration of diisopropylamine, B is the concentration of α , α -dimethylolpropionic acid, and C is the concentration of added boric acid. The boric acid additions result in the formation of complexes having the same anions as those of Example II, but with the associated cation being the diisopropylammonium ion.

TABLE II

| A | B | C | Resistivity ohm-cm | Maximum Formation Voltage |
|---|---|---|---|---|
| 0.125 | 0.25 | 0 | 1250 | 265 |
| 0.125 | 0.25 | 0.125 | 457 | 287 |
| 0.125 | 0.25 | 0.25 | 476 | 310 |
| 0.25 | 0.25 | 0 | 1100 | 320 |
| 0.25 | 0.25 | 0.125 | 536 | 265 |
| 0.25 | 0.25 | 0.25 | 457 | 323 |
| 0.25 | 0.50 | 0 | 792 | 280 |
| 0.25 | 0.50 | 0.25 | 320 | 310 |
| 0.25 | 0.50 | 0.50 | 335 | 337 |
| 0.50 | 0.50 | 0 | 792 | 252 |
| 0.50 | 0.50 | 0.25 | 409 | 320 |
| 0.50 | 0.50 | 0.50 | 354 | 338 |
| 0.125 | 0.25 | 0.125 | 457 | 287 |
| 0.25 | 0.50 | 0.25 | 320 | 310 |
| 0.375 | 0.75 | 0.375 | 281 | 325 |

Electrolytic capacitors prepared with the following electrolyte systems gave satisfactory aging and satisfactory to excellent shelf life characteristics. Some of these include the following:

1. 0.5M tetramethylammonium α , α -dimethylolpropionate in dimethylformamide (DMF) prepared by mixing 200 g. DMF, 23.2 g. of this salt and 4.5 ml. water, dissolving and filtering. The resistivity of this electrolyte was 119 ohm-cm. The capacitance sections impregnated with the electrolyte possessed the rating of 100 μf., 60 volts DC. The following values given are averages of 5 units during a test at 125° C with 50 volts DC applied.

| Hours | C(μf) | RC(ohm-μf) | I(ma) |
|---|---|---|---|
| Initial | 116.0 | 27 | 2.3 |
| 500 | 115.8 | 40 | 0.37 |
| 1000 | 114.8 | 48 | 0.35 |

The foregoing data indicate that the capacitors are electrically stable and the leakage current values are good. Also this data indicates that there is no attack of the anodic aluminum oxide by the solvent thereof, at this temperature.

2. 0.1M tetramethylammonium α , α -dimethylolpropionate in dimethylformamide. The resistivity of this electrolyte was 305 ohm-cm. The capacitance sections impregnated with the electrolyte possessed the rating of 60 μf., 50 volts DC. The following values given are averages of 5 units during a test at 125° C. with 50 volts DC applied.

| Hours | C(μf) | RC(ohm-μf) | I(ma) |
|---|---|---|---|
| Initial | 68.92 | 63 | 3.4 |
| 500 | 67.41 | 75 | 0.064 |
| 1000 | 65.24 | 104 | 0.001 |

The foregoing data indicate that the capacitors are electrically stable and that the leakage current improves with time.

3. 0.1M tetramethylammonium boro-di-α , α -dimethylolpropionate in a dimethylformamide - formamide solution (1:1) with 1M H$_3$BO$_3$. The resistivity of this electrolyte was 625 ohm-cm. The capacitance sections impregnated with the electrolyte possessed the rating of 60 μf., 50 VDC. The following values given are averages of 4 units measuring capacitance VS. temperature.

| 25°C | | −55°C | | −30°C | | −10°C | | 0°C | | 25°C | |
|---|---|---|---|---|---|---|---|---|---|---|---|
| C | RC | C | RC | C | RC | C | RC | C | RC | C | RC |
| 70.70 | 44.5 | 58.80 | 921 | 66.10 | 175 | 68.36 | 83 | 69.19 | 62 | 70.48 | 43 |

As can be observed, very little change has occured in the capacitance at 25° C after going through the above temperature cycle.

4. An electrolyte was prepared, in situ, in DMF using 3.35 g. dimethylolpropionic acid, 1.26 g. diisopropylamine, 2.32 g. boric acid and a small amount of salicylic acid added to enhance formation of the areas not covered by oxide, such as the cut edges of the anode. The resistivity of this electrolyte was 465 ohm-cm. The capacitance sections impregnated with the electrolyte possessed the rating of 27 $\mu$f., 250 volts DC.

5. An electrolyte was prepared, in situ, in DMF using 3.35 g. dimethylolpropionic acid, 2.32 g. tributylamine, 2.32 g. boric acid and a small amount of salicylic acid added thereto. The resistivity of this electrolyte was 590 ohm-cm. The capacitance sections impregnated herewith possessed the rating of 27 $\mu$f. 250 V.

| Hours | C($\mu$f) | RC(ohm-$\mu$f) | I(ma) |
|---|---|---|---|
| Initial | 27.14 | 43 | 0.007 |
| 72 hr. shelf test | 26.80 | 42 | 0.011 |
| 250 hr. life test | 26.58 | 37 | 0.031 |

The foregoing data indicate that the capacitors are electrically stable and the leakage current values are good. The compound formed thereby is tributylammonium boro-di- $\alpha$, $\alpha$-dimethylolpropionate.

The tetramethylammonium boro-di- $\alpha$, $\alpha$-dimethylolpropionate was studied as an electrolyte solute in N-methylformamide and formamide, as well as in dimethylformamide. The first two solvents are of special interest, since, compared to di-methylformamide, N-methylformamide increases the porosity of the paper spacer four fold and formamide increases it eight fold. The electrolyte systems contemplated herein are not limited to those wherein the solvent is dimethylformamide, N-methylformamide, or formamide since other solvents and mixtures may be employed. For example, water, ethylene cyanohydrin, the cellosolves, glycols, N-methylpyrrolidone, dimethylsulfoxide, etc., and mixtures thereof may be employed. It is also to be understood that the electrolytes of the present invention have utility in capacitors other than aluminum capacitors, e.g. tantalum, niobium, etc.

Since it is obvious that many changes and modifications can be made in the above-described details without departing from the nature and spirit of the invention, it is to be understood that the invention is not limited to said details except as set forth in the appended claims.

What is claimed is:

1. An electrolytic capacitor comprising a capacitor housing; a capacitance section within said housing having a plurality of electrodes, at least one electrode being a valve metal having on its surface an insulating oxide layer, said section being impregnated with an electrolyte consisting essentially of a solvent having dissolved therein a compound derived from $\alpha$, $\alpha$-dimethylolpropionic acid.

2. The capacitor of claim 1 wherein said compound is tetramethylammonium $\alpha$, $\alpha$-dimethylolpropionate.

3. The capacitor of claim 1 wherein said compound is tetramethylammonium boro-di- $\alpha$, $\alpha$-dimethylolpropionate.

4. The capacitor of claim 1 wherein said compound is diisopropylammonium $\alpha$, $\alpha$-dimethylolpropionate.

5. The capacitor of claim 1 wherein said compound is 1,4-diazabicylooctane $\alpha$, $\alpha$-dimethylolpropionate.

6. The capacitor of claim 1 wherein said compound is diisopropylammonium boro-di- $\alpha$, $\alpha$-dimethylolpropionate.

7. The capacitor of claim 1 wherein said compound is 1,4-diazabicylooctane boro-di- $\alpha$, $\alpha$-dimethylolpropionate.

8. The capacitor of claim 1 wherein said compound is tributylammonium boro-di- $\alpha$, $\alpha$-dimethylolpropionate.

9. The capacitor of claim 10 wherein said valve metal is aluminum, said oxide layer is aluminum oxide, said solvent is dimethylformamide, and said compound is tributylammonium boro-di $\alpha,\alpha$-dimethylolpropionate.

10. The capacitor of claim 1 wherein said solvent is at least one member selected from the group consisting essentially of dimethylformanide, N methylformamide, and formamide.

* * * * *